Sept. 28, 1948.  J. B. GALLIANO  2,450,193
POT HANDLE
Filed Aug. 2, 1946
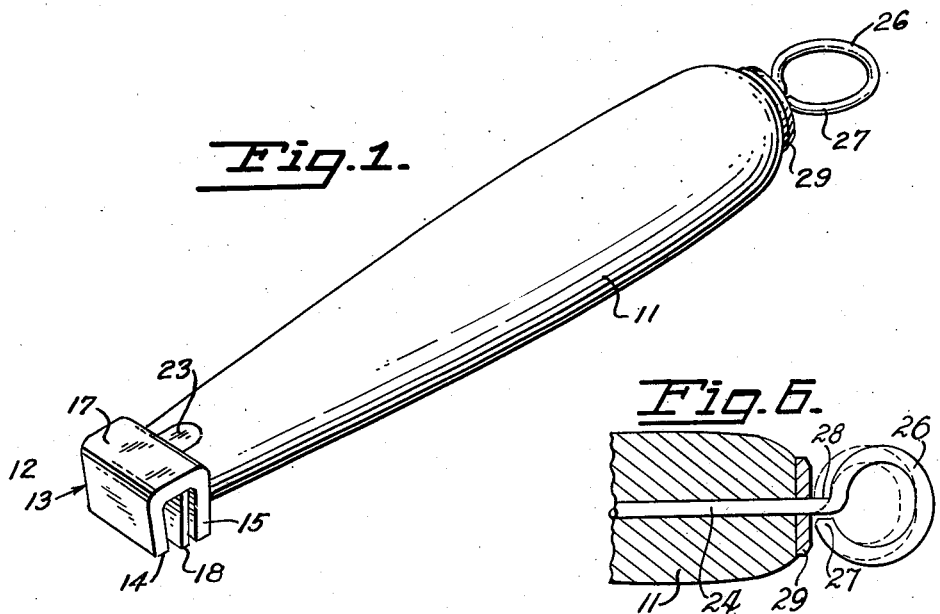
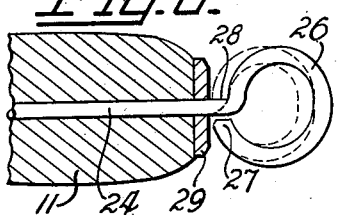
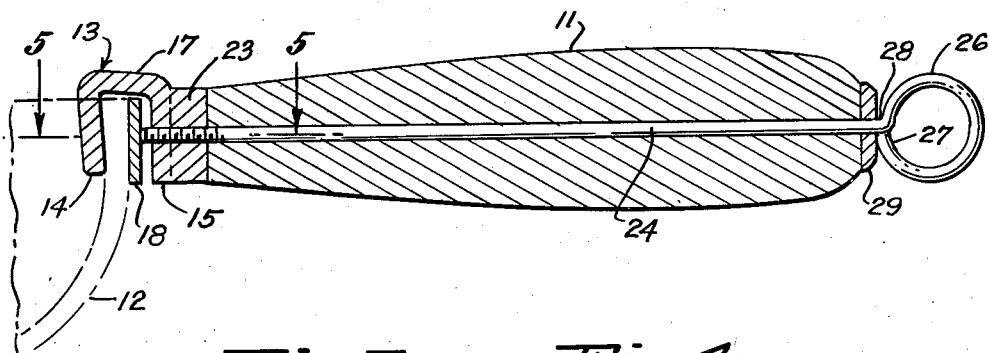
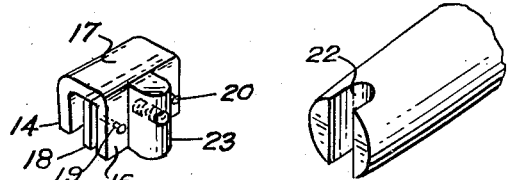
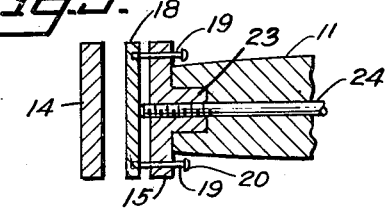
INVENTOR.
JOHN B. GALLIANO
BY
Stephen P. Townsend
ATTORNEY Patented Sept. 28, 1948

2,450,193

UNITED STATES PATENT OFFICE 2,450,193

POT HANDLE

John B. Galliano, Oakland, Calif., assignor to Industrial Ideas, Inc., Oakland, Calif., a corporation of California Application August 2, 1946, Serial No. 688,025

2 Claims. (Cl. 294—27)

This invention relates to handles which can be attached to pots, pans, and other kitchen utensils of a similar nature.

Objects of the invention are to provide a handle which the housewife or other person working in the kitchen can quickly and easily attach to a pot, pan or other container, so that it can be easily handled whether hot or cold; to provide such a handle having an attaching means which holds it firmly and securely to the article to which it is attached so that it will not slip or tilt; and to provide an easily attachable handle which has a smooth, cool handgrip which insulates a hand on the grip from the heat of a hot pot, pan, or the like. Other objects and advantages of the invention will be apparent on reading this specification in connection with the accompanying drawings.

On such drawings:

Fig. 1 is a perspective view of the preferred embodiment of the handle of this invention.

Fig. 2 is a longitudinal section thereof.

Fig. 3 is a perspective view of the clamp.

Fig. 4 is a perspective view of the part of the handle adjacent to the clamp.

Fig. 5 is a section on the line 5—5 on Fig. 2.

Fig. 6 is a fragmentary longitudinal view of the handle in section showing in full lines the position of the loop when the handle is in fully open position, and showing in dotted lines the position of the loop when the handle is in fully closed position.

The handle has a handgrip 11, at an end of which is a clamp which is to be attached to a pot, pan, or the like 12 at the rim or edge thereof. The clamp comprises an inverted U-shaped member 13, having depending arms 14 and 15 joined by a web 17. A movable clamp member or arm 18 is movably maintained in position between the arms 14 and 15, the movement being such as to increase or decrease its distance from the arm 14 so that the pot rim can enter between and be pressed tight thereon.

Guide pins 19 are affixed to the clamp member 18, extend slidably through perforations through the arm 15, and have heads 20 which are too large to pass through the openings through which the pins extend. The clamp member thus can not be accidentally separated from the U-shaped member 13 but can move toward or away from the arm 14.

The handgrip 11 may be made of any suitable material which does not conduct heat well, so that it will be comfortable to the hand. It is provided with a groove 22 which extends across the end thereof. A tongue or rib 23 is provided on the rear face of the arm 15, having about the same dimensions as the groove 22 and fitting therein. The tongue and groove, as will be seen in Figs. 2 and 3, are so arranged that the U-shaped member can not turn or twist with respect to the handle when they are assembled. The handgrip 11, the rib 23, and the arm 15 have openings therethrough in line with each other to accommodate a rod 24 which extends through them and projects beyond at both ends thereof. That end of the rod which is adjacent to the U-shaped member 13 is threaded exteriorly, and the opening through the arm 15, and preferably also that through the rib 23, have screw threads to mesh with the threads on the rod. The other end of the rod is formed into a loop 26 which can be turned to rotate the rod 24, which, by reason of the threads, causes it to advance to the left, as seen in Figs. 2 and 5, and push the clamp member to the left, or to be retracted therefrom, depending on the direction of rotation of the handle and rod. The rod and loop are of spring metal, and the free end 27 is closer to the handgrip than the point 28 at which the rod and loop meet. A washer 29, of metal or other suitable hard material, is provided between the end 27 and the handgrip 11, against which the end 27 bears as the loop is rotated, in order to prevent abrading the end of the handgrip. The threaded connection between the rod 24 and the clamp, in connection with the loop 26, holds the clamp and handgrip together so that no other attachment between the two is required.

For attaching the handle to a pot or other container, the rod 24 is retracted, if it is not already so, by turning the loop 26 in the proper direction. The web 17 is then set down onto the edge of the pot or container, with the arm 14 at the inner face, and the movable clamp member 18 at the outer face. Rotation of the loop 26 in the proper direction then causes the rod to push the movable clamp member to move it toward the arm 14 and thereby clamp the pot between them. The rod 24 extends beyond the end of the washer and the meeting point of this rod and the loop is a short distance away from, and out of contact with, the washer even when the handle is clamped firmly to a pot or the like. The free end 27 of the loop, however, presses resiliently, but firmly, against the washer when the handle is clamped to a pot or the like, and by such pressure serves to lock the rod against accidental rotation and loosening of the handle.

Certain details have been illustrated and described in explaining the invention, some of which may be changed, omitted or added to without departing from the spirit of the invention, the scope of which is defined in the appended claims.

I claim:

1. A quickly and securely attachable pot handle having a handgrip, a clamp at an end of the handgrip, the clamp having a fixed gripping arm to be located inside the pot adjacent to its rim and a movable gripping arm to be located outside the pot opposite to the fixed arm, a rod to move the movable arm toward the fixed arm and extending through the handgrip and a part of the clamp and having screw thread connection with the latter, the rod projecting beyond the other end of the handgrip, and a loop on the projecting end of the rod and having a part closer to the handgrip than the meeting point of the rod and the loop.

2. A quickly and securely attachable pot handle having a handgrip, a clamp at an end of the handgrip, the clamp having arms projecting downwardly and fixedly attached to each other, one of the arms having a non-circular protuberance thereon, the adjacent end of the handgrip having an indentation into which the protuberance fits to prevent rotation between the clamp and the handgrip, guide pins slidably mounted in the arm adjacent to the handgrip, an arm attached to the guide pins and movable between the first mentioned arms toward one or the other, the protuberance and the arm carrying it having an opening therethrough at least a part of which has screw threads, the handgrip having an opening therethrough in line with the first mentioned opening, and a rod having screw threads at the threaded opening, extending out beyond the other end of the handgrip and being formed into a loop thereat, rotation of the loop in one direction causing the rod to press the movable arm toward the arm further from the handgrip to clamp a pot between them adjacent to its rim, the loop, when a pot is clamped, beginning at a point on the rod beyond the loop end of the handgrip and terminating in a free end in contact with the end of the handgrip.

JOHN B. GALLIANO.

REFERENCES CITED

The following references are of record in the file of this patent:

UNITED STATES PATENTS

| Number | Name | Date |
|---|---|---|
| 436,073 | Clow et al. | Sept. 9, 1890 |
| 1,070,569 | Wilson | Aug. 19, 1913 |
| 1,606,833 | Grover | Nov. 16, 1926 |
| 2,092,198 | Anderson | Sept. 7, 1937 |